United States Patent [19]

Plowman et al.

[11] Patent Number: 4,659,528

[45] Date of Patent: Apr. 21, 1987

[54] METHOD OF MAKING AN ELECTROLYTE-PERMEABLE, HETEROGENEOUS POLYMER SHEET FOR A GAS DIFFUSION COMPOSITE ELECTRODE

[75] Inventors: Keith R. Plowman; Charles E. Goldsmith, both of Baton Rouge, La.

[73] Assignee: The Dow Chemical Company, Midland, Mich.

[21] Appl. No.: 822,084

[22] Filed: Jan. 24, 1986

Related U.S. Application Data

[62] Division of Ser. No. 678,139, Dec. 4, 1984, Pat. No. 4,581,116.

[51] Int. Cl.$^4$ ............... B29C 43/24; B29C 71/00; B29D 7/01
[52] U.S. Cl. ........................... 264/49; 264/42; 264/43; 264/105; 264/122; 264/127; 264/344
[58] Field of Search ............... 264/42, 43, 49, 105, 264/122, 127, 175, 344; 204/284, 291, 292, 294; 429/41, 42

[56] References Cited

U.S. PATENT DOCUMENTS

| | | | |
|---|---|---|---|
| 4,058,482 | 11/1977 | Baris et al. | 252/425.3 |
| 4,150,076 | 4/1979 | Baris et al. | 264/49 |
| 4,370,284 | 1/1983 | Solomon | 264/42 |
| 4,568,442 | 2/1986 | Goldsmith | 429/42 X |

Primary Examiner—Jan Silbaugh
Assistant Examiner—Leo B. Tentoni

[57] ABSTRACT

A gas diffusion composite electrode is disclosed which is suitable for use in combination with an electrically conductive current collector. The electrode comprises an electrochemically active, porous and heterogeneous layer containing (1) an interconnected, hydrophilic island material comprising a blend of a major amount of an electrically conductive, particulate material, such as carbon black, in combination with an electrochemically active catalyst, and a minor amount of a hydrophobic polymer in combination with (2) a hydrophobic matrix material consisting essentially of a hydrophobic polymer rendered substantially porous by removal of a pore-forming ingredient. Methods of preparing the heterogeneous layer and the composite electrode are also disclosed.

14 Claims, No Drawings

METHOD OF MAKING AN ELECTROLYTE-PERMEABLE, HETEROGENEOUS POLYMER SHEET FOR A GAS DIFFUSION COMPOSITE ELECTRODE

This application is a division of application Ser. No. 678,139, filed Dec. 4, 1984, now U.S. Pat. No. 4,581,116.

BACKGROUND OF THE INVENTION

1. Field of the Invention

This invention relates to electrochemical cells such as fuel cells or electrolytic cells, such as chlor-alkali electrolytic cells utilizing air or oxygen depolarized composite cathodes.

2. Description of the Prior Art

Electrodes for use in electrochemical cells, particularly air or oxygen diffusion cathodes for use in chlor-alkali electrolytic cells which are based upon carbon in combination with wetproofing agents such as polytetrafluoroethylene, are subject to failure as the result of the excessive wetting of the electrochemically active hydrophilic portion of the electrode by the electrolyte. This excessive wetting is often partially counteracted by laminating the electrochemically active layer to a porous, hydrophobic (backing) layer. The pores of the hydrophobic layer pass air or oxygen so as to make the air or oxygen available to the electrochemically active layer of the electrode.

The air or oxygen gas diffusion cathode in a chlor-alkali electrolysis cell is more energy efficient than electrodes which do not pass air or oxygen to effect depolarization since in gas diffusion electrodes the unwanted by-product (hydrogen) in the electrolysis of an alkali metal halide is eliminated. The air or oxygen diffusion cathodes not only eliminate the production of hydrogen at the cathode but force the formation of desirable hydroxide ions.

It is known to form electrochemically active layers in an electrode utilizing as an active component an electrically conductive carbon black. The tendency of the electrically conductive carbon black to be wetted by the electrolyte must be controlled within limits in order to provide an electrode with a reasonable period of usefulness. The efficiency of the carbon black active layer is reduced during operation of the cell as the pores of the carbon black become completely wet out by the electrolyte since the air or oxygen necessary for depolarization of the active layer of the electrode does not under complete wetting conditions penetrate sufficiently into the active portion of the electrode so as to effect depolarization.

Prior art carbon-based hydrophilic electrolyte-active layers of air or oxygen depolarized electrodes have been rendered less susceptible to wetting by the electrolyte by blending a hydrophobic polymer such as polytetrafluoroethylene with carbon to impart hydrophobicity to the carbon and thus increase the useful life of the electrode. It is thus common to employ mixtures of carbon black and polytetrafluoroethylene in particulate form in the preparation of the electrolyte active layer of the electrode. Additionally, a homogeneous, porous, hydrophobic layer of polytetrafluoroethylene has been employed in prior art gas diffusion electrodes on the side of the electrode facing away from the electrolyte. In a chlor-alkali electrolytic cell, this side of the gas diffusion electrode is normally in contact with air or oxygen under pressure. The pressure helps to maintain gas penetration into the electrolyte-permeable layer, particularly in areas of the electrode having large pores.

Heretofore, these methods of increasing the useful life of gas diffusion electrodes have not been entirely satisafactory and nearly complete wetting of the electrolyte-permeable layer of the electrode ultimately takes place over a relatively short period of time causing failure of the electrode.

In U.S. Pat. No. 4,058,482 and U.S. Pat. No. 4,150,076, a fuel cell electrode is disclosed in which a sheet material is formed from co-agglomerates of a polymer such as polytetrafluoroethylene and a pore-former. This is subsequently bonded to a support plate to define the fuel cell electrode. The disclosed co-agglomerates replace the earlier polytetrafluoroethylene suspensions previously employed in the preparation of fuel cell electrodes. In the preparation of the electrode, the co-agglomerates are mixed with a catalyst suspension and surfactant-coated co-agglomerates and subsequently the mixture is filtered and the filter cake bonded to a support plate which has been treated with fluorinated ethylene propylene copolymer to impart the requisite structural integrity to the resulting fuel cell electrode. The electrode is dried and sintered and thereafter the pore-former is leached out by immersing the electrode in an acid which will attack the pore-forming ingredient. Zinc oxide is disclosed as a useful pore-forming ingredient. The support plate referred to above is defined as a sheet material consisting of carbon fibers which have been bonded together to form a gas-permeable paper-like structure having sufficient strength to function as a support for the electrode.

SUMMARY OF THE INVENTION

The present invention overcomes the tendency of prior art gas (air or oxygen) diffusion composite electrodes to flood and rapidly fail as the electrochemically active, hydrophilic layer of the electrode becomes wet by the electrolyte. This result is accomplished by the novel technique of employing an electrode having an electrically conductive current collector, a microporous hydrophobic layer, and a porous, heterogeneous, electrochemically active layer comprising a mixture of (1) a hydrophilic interconnected island material comprising a major amount of an electrically conductive, particulate material containing admixed therewith an electrochemically active catalyst and a minor amount of a hydrophobic polymer with (2) a hydrophobic matrix material consisting essentially of a hydrophobic polymer rendered substantially porous by the removal of a pore-forming ingredient. Before removal of the pore-forming ingredient, the matrix consists of a pore-former bonded with a hydrophobic polymer. The interconnected island material is electrically conductive while the matrix material is non-conductive and is not easily wet out by contact with the electrolyte of the electrochemical cell. The heterogeneous layer can be laminated to a current collector placed upon the side of the layer in contact with the electrolyte. Alternatively, the current collector can be sandwiched between the heterogeneous layer and a porous, homogeneous, hydrophobic, polymer layer of the electrode intended to be exposed to the gas source.

DESCRIPTION OF THE PREFERRED EMBODIMENTS

The present invention is based upon the discovery that the wettability of the active layer of a gas (air or oxygen) diffusion electrode, particularly a cathode in a chlor-alkali electrolytic cell, can be substantially reduced without impairing the energy efficiency of the electrode by increasing the heterogeneity of the active layer. The heterogeneous active layer of a composite gas diffusion electrode of the invention is prepared using an equal or minor amount by weight of (1) an interconnected, hydrophilic island material comprising a major amount of an electrically conductive, hydrophilic, particulate material containing an electrochemically active catalyst and a minor amount of a hydrophobic polymer in admixture with an equal or major amount by weight of (2) a hydrophobic matrix material comprising a blend of a minor amount of a hydrophobic polymer wetproofing agent and a major amount of a pore-forming ingredient. The particulate material in (1) and (2) is bonded with the hydrophobic polymer. An electrode active layer is obtained in accordance with the invention containing interconnected islands of an electrochemically active mixture in a matrix of a hydrophobic polymer having interconnected gas channels. Both interconnected island component and matrix component are porous. The porosity of the matrix component is obtained substantially by the incorporation with the hydrophobic polymer of a pore-forming ingredient which is removed subsequent to formation of the hydrophilic layer of the electrode. It is within the invention to utilize composite electrodes utilizing an active layer prepared as described above in conjunction with a current collector without an additional porous, hydrophobic layer of a hydrophobic polymer.

The electrically conductive, hydrophilic, particulate material forming a part of the interconnected islands of the electrode of the invention can be an electrically conductive carbon. For example, acetylene black, which has a small particle size and is electrically conductive, can be used. Some other carbon blacks, such as certain furnace blacks, are also electrically conductive and can be used. The carbon used can be porous or non-porous. Generally, carbon blacks having an ultimate particle size ranging from about 0.01 to 0.05 microns, and more usually within the range of about 0.01 to about 0.03 microns and low internal surface area are suitable. In a preferred embodiment, acetylene black carbon particles are used such as are commercially available under the trademark VULCAN XC-72 from the Cabot Corporation.

As an electrochemically active catalyst for use as a component of the active layer of a composite cathode in a chlor-alkali electrolysis cell, a precious metal catalyst such as silver, platinum, palladium, rhodium, and the like (Group VIII of the periodic table, periods 5 and 6) or metal oxides such as combinations of nickel oxide and lithium oxide can be used. Since a fine particle size is desirable, an especially preferred catalyst is platinum black supported on a particulate carbon. Silver is also a preferred catalyst.

A polymeric hydrophobic binder, preferably a halocarbon polymer binder, is utilized in admixture with the carbon black and pore-forming ingredient in the preparation of the active layer of the electrode. The binder can be utilized as an aqueous dispersion or a dry powder to make the ultimate mixture of particulate material, i.e., carbon black and binder which are to form the conductive interconnected island component making up the hydrophilic component of the electrode. The particulate material can be mixed with the hydrophobic polymer binder by first preparing an aqueous or non-aqueous slurry of these components. Thereafter, the hydrophobic polymer is precipitated onto the particulate material by chemical or physical means. Generally, the blend is mixed so as to make the blend as homogeneous as possible by adequate mixing in the presence of a liquid dispersion medium. A hydrophobic polymeric material is used admixed with a solid pore-former to form the matrix component. If a water soluble pore-former is used, the dispersing medium must be an organic liquid. Aqueous polymer dispersions of the hydrophobic polymer are not preferred since these would require the use of an organic solvent soluble pore-former. When organic media are used, precipitation is accomplished by physical means such as by filtration and evaporation.

While polytetrafluoroethylene is the most preferred polymer for use in the preparation of the electrodes of the invention, if desired, other hydrophobic polymers can be used instead. Preferred hydrophobic polymers are the thermoplastic halocarbon polymers selected from the group consisting of at least one of polymers of tetrafluoroethylene, fluorinated ethylene propylene, copolymers thereof having the moieties.
$(-CX_1X_2-CX_3CX_4-)$ and
$(-CY_1Y_2-CY_3Y_4-)$, and
homopolymers having the moieties
$(-CY_1Y_2-CY_3F-)$
wherein $X_1$, $X_2$, $X_3$, $X_4$, $Y_1$, $Y_2$, $Y_3$, and $Y_4$ are selected from the group consisting of fluorine, chlorine, and hydrogen, at least one of said X and Y being fluorine. Preferably the halocarbon polymer is a fluorocarbon polymer selected from the group consisting of at least one of copolymers having an ethylene moiety and a fluorocarbon moiety chosen from the group consisting of
$(-CFH-CH_2-)$,
$(-CF_2-CH_2-)$,
$(-CF_2-CFH-)$, and
$(-CH_2-CClF-)$.
Suitable hydrophobic polymers can generally include any polymer having a low surface energy which will remain stable under fuel cell or chlor-alkali electrolysis cell operating conditions. Such polymers include polymers of various halogen-substituted hydrocarbon monomers, particularly fluorine-substituted olefinic monomers. Halogen-containing polymers that can be employed include polymers of fluorocarbons and substituted fluorocarbons wherein one or more fluorine atoms are replaced by hydrogen and chlorine. Alternative halocarbon polymers include polytrifluoroethylene, polyvinylfluoride, polyvinylidene fluoride, polytrifluorochloroethylene, and copolymers of different fluorocarbon monomers such as copolymers of tetrafluoroethylene and hexafluoropropylene.

In addition to the halocarbon polymers, various other hydrophobic polymers which can be used include hydrocarbon polymers having a molecular weight of 50,000 to 1,000,000 or more, and a free surface energy close to or below that of polyethylene. Representative polymers include polymers and copolymers of ethylene, propylene, 3-ethyl-1-butene, 4-methyl-1-pentene, and 4,4-dimethyl-1-pentene.

Generally, the proportion of the hydrophobic polymer utilized to form the hydrophobic matrix of the active layer of the electrode of the invention is about 20 to about 60 percent, preferably about 25 to about 40 percent by weight, based upon total weight. This is used in combination with about 40 to about 80 percent, preferably about 60 to about 75 percent by weight, based upon total weight, of a pore-forming particulate material. The amount of pore-forming ingredient used in the formation of the matrix of the active layer of the electrode of the invention will depend upon the nature of the pore-former used and upon the permeability or porosity desired. The matrix volume present in the active layer should be over 20 percent and normally is in the range of about 25 to 60 percent, preferably about 25 to 40 percent of the total volume of the electrode active layer. The porosity contributed by the matrix is equal to the volume fraction of matrix present multiplied by the volume fraction of pore-former present in the matrix. The electrochemically active, hydrophilic, electrolyte-permeable interconnected islands contained in said matrix generally contain about 1 to about 10 percent, preferably about 2 to about 5 percent by weight of hydrophobic polymer and 90 to 99 percent, preferably about 95 to about 98 percent by weight of an electrically conductive, hydrophilic, particulate material such as carbon black or a carbon black supported catalyst. The matrix material is present in the electrolyte-permeable layer of the electrode in an equal or major amount with respect to the electrochemically active interconnected island material.

The procedure for preparing the electrode of the invention will be illustrated with polytetrafluoroethylene as the hydrophobic polymer binder and carbon black as the electrically conductive, hydrophilic, particulate material and sodium chloride as the pore-forming material. Two powder mixes are prepared, one comprising varying amounts of carbon black and hydrophobic (halocarbon) polymer, i.e., polytetrafluoroethylene, and the other comprising varying amounts of pore-former and hydrophobic polymer. The active layer of the electrode of the invention is preferably prepared by forming a dispersion of the carbon black or particulate solid pore-forming ingredient and polytetrafluoroethylene powder in an organic liquid dispersion medium. Generally the organic liquid dispersion medium is heated to a temperature of about 50 to about 80 degrees centigrade to assist in the formation of the dispersion. The polytetrafluoroethylene in powder form is added to the liquid dispersion medium and the mixture is blended to form a polymer dispersion followed by addition with mixing of the particulate pore-former or carbon-supported catalyst. Thereafter precipitation of the polytetrafluoroethylene on to the carbon black or the pore-former is accomplished simply by filtering out the liquid dispersion medium. The filter cake obtained is transferred to a container suitable for oven drying to obtain a coarse, dry aggregate which is subsequently ground to a fine powder for further use.

Alternatively, the electrochemically active layer of the electrode of the invention can be prepared using aqueous dispersions of polytetrafluoroethylene and carbon black or pore-forming ingredient. Precipitation of the polytetrafluoroethylene onto the carbon black or pore-former can be accomplished by raising the temperature from below 15° C. to 30° C. or by destablizing the polytetrafluoroethylene dispersion by raising or lowering the pH of the dispersion so as to cause precipitation (coagulation).

In the final steps of the procedure for the preparation of the active layer of the composite electrode of the invention, the separately prepared powder blends of polytetrafluoroethylene with carbon black or pore-former are mixed in appropriate amounts to blend the two powders. The powder blend intended for use in the formation of the matrix of the active layer is used in equal or major amounts by weight. The powder blend intended for use in the formation of the interconnected islands of the active layer is used in equal or minor amounts by weight. Thereafter, a liquid dispersion medium, preferably an organic medium, at ambient temperature is added to the dry powders in a suitable amount so that a cohesive and pliable dough results. The dough is formed into a block and the polytetrafluoroethylene component of the dough subjected to fibrillation utilizing a series of calendering operations in which the dough is passed through closely spaced metal rolls with the spacing between the rolls being reduced at each successive pass through the rolls so as to prepare a thin sheet of electrode material. Thus the calender rolls initially can be set at between 200 to 300 thousandths of an inch with subsequent reductions in the setting of the space between the rolls utilized to bring the final calendered sheet to a thickness of about 0.02 inch.

Generally, the electrode sheet obtained is laminated to (1) a current distributor (also termed current collector) layer such as a 20×20×0.01 inch silver-plated nickel metal wire mesh, and (2) a wetproofing, or backing layer of a hydrophobic (halocarbon) polymer, i.e., polytetrafluoroethylene, which is rendered porous so as to allow passage of the gas, i.e., air or oxygen, into the part of the electrode in contact with the electrolyte. Porosity can be obtained by the incorporation and subsequent removal of a pore-former. The wire mesh current distributor can be prepared from a metal selected from the group consisting of stainless steel, nickel, platinum group metals and mixtures thereof. Preferably, the metal mesh is prepared from a metal selected from the group consisting of silver or silver-coated nickel, silver-coated steel, and silver-coated valve metals. Lamination of the hydrophilic layer to a current distributor layer and a wetproofing, gas-porous, hydrophobic layer can be accomplished by calendering or can take place (if a non-volatile pore-former is utilized) in a hydraulic press, for instance, at a temperature of about 110 to about 120 degrees centigrade and pressures of about 1.5 to about 8.5 tons per square inch. The current distributor can be laminated to the electrically conductive face of the electrode or form an intermediate layer between the electrochemically active layer and the hydrophobic backing layer of the electrode.

An organic liquid diluent dispersion medium is preferably used in the preparation of the dispersions which are used to form the active layer of the electrodes of the invention. Most preferably the organic liquid is an aliphatic or aromatic hydrocarbon or mixtures thereof which are liquid at normal atmospheric pressure and temperatures utilized in making the dispersions. Representative aliphatic hydrocarbons include pentane, hexane, heptane, and octane. Representative aromatic hydrocarbons include benzene, toluene, and xylene. Also useful are the cycloaliphatic hydrocarbons such as cyclohexane, low, medium, and high boiling mineral oil fractions which can contain mixtures of aliphatic hydrocarbons, naphthenes, and aromatic hydrocarbons.

The organic liquid diluent dispersion medium can be a halogenated hydrocarbon such as trichloroethylene, or can be selected from other types of organic liquids such as aliphatic and aromatic alcohols, glycols, and amino alcohols. Representative aliphatic alcohols include isopropanol, 2-butanol, 2-methyl-2-butanol, isobutanol, n-butanol, 2-pentanol, 3-pentanol, 3-hexanol, 4-heptanol, 2-ethyl-1-hexanol, etc. Representative aromatic alcohols include particularly the aralkyl alcohols such as benzyl alcohol, 3-methylbenzyl alcohol, 3-phenylpropanol, etc. Generally, the aromatic alcohols are free of aliphatic unsaturation and have hydroxy substituents on aliphatic carbon atoms, and contain up to 16 carbon atoms. Representative glycols include 1,2-ethanediol, 1,2-propanediol, mixtures of glycerol and ethylene glycol, diethylene glycol, etc. Representative amino alcohols include ethanolamine, diethanolamine, triethanolamine, etc.

While not wishing to be bound by theory, it is believed that the improved performance characteristics of the composite gas diffusion electrodes of the invention result generally from a novel electrode structure having greater heterogeneity.

Improved performance of the electrode of the invention is considered to be dependent particularly upon the drying step utilized in the preparation of the electrode layers. In the drying step, polymer is deposited onto the pore-former in one blend and onto the carbon in a second blend. Deposition of the polymer onto the pore-former creates a structure of the particulate pore-former which leads to improved interconnection of this particulate material when it is incorporated into the active layer of the electrode. Upon removal of the pore-former, extended channels bounded by hydrophobic polymer are left in the active layer of the electrode. These channels are resistant to wetting and provide stable gas regions within the active layer of the electrode. Pore-former size can be adjusted to provide a range of dimensions in the channels.

In prior art carbon-based electrodes utilizing a halocarbon polymer such as polytetrafluoroethylene as a binder and wetproofing agent, a completely homogeneous mixture of the carbon black and polymer components of the electrode is never achieved or desired. Accordingly, the complete wetproofing of the carbon particles is never achieved so that during operation of the electrode, as the electrolyte permeates the hydrophilic carbon particles, areas of hydrophobicity imparted by the polytetrafluoroethylene are gradually cut off from effective communication with the gas which is fed to the electrode from the side of the electrode opposite to that which is exposed to the electrolyte. The gradual reduction in efficiency of the electrode is believed to result from this process since the effective depolarization of the electrode cannot, under these circumstances, as effectively take place.

The electrode of the invention is prepared from two separate blends, one comprising a hydrophilic carbon and a hydrophobic (halocarbon) polymer and a second blend of pore-forming ingredient and a hydrophobic polymer. The carbon-containing blend contains a low proportion of hydrophobic polymer, which functions as a binder for the particulate carbon component. The other blend, includes a hydrophobic polymer-bonded, pore-forming ingredient but no hydrophilic component. When the active layer of the electrode is composed of a mixture of these separately prepared blends, a better controlled heterogeneity in the hydrophilic layer of the electrode can be created. This is maintained over a longer period of time, as compared to prior art composite gas diffusion electrode active layers.

The gaseous porosity of the matrix component of the active layer of the composite electrode of the invention can be more effectively maintained during use as a result of the matrix having no hydrophilic component. The low proportion of hydrophobic polymer in the interconnected islands contained within the matrix of the electrolyte-contacting layer of the electrode is insufficient to prevent said islands from being predominantly wet out by the electrolyte. The high proportion of hydrophilic carbon contained in these interconnected islands ensures that they will be wet with the electrolyte. The active layer of the electrode can thus be considered to be composed of two intermingled components having varying hydrophobicity; the wetproof matrix provides high gas porosity while the interconnected island component is both electrolyte-permeable and electrically conductive.

The pore-forming ingredient utilized in the formation of the composite electrodes of the invention can be a particulate solid, or a polymeric pore-forming ingredient. These pore-forming ingredients can be either water-soluble or water-insoluble. Selection of a pore-former is dependent upon the dispersion medium used. Generally, the pore-forming ingredient utilized is one which is insoluble in the dispersion medium utilized in the formation of the composite electrode. In addition, the pore-forming material is chosen so as to be insoluble in any of the liquid diluent dispersion media employed in the preparation of the active layer of the composite electrode of the invention. The pore-forming ingredients utilized are chosen so as to be removable by suitable chemical and/or physical means which will not damage the structure of the active layer of the electrode or dissolve the hydrophobic polymer utilized. Such means as leaching with water or a mineral acid, or vaporization, or sublimation are suitable methods of removing the pore-former subsequent to formation of the hydrophilic layer of the composite electrode of the invention.

Representative water-soluble pore-forming ingredients are the alkali metal salts such as sodium chloride, potassium chloride, and mixtures thereof. Representative substantially water-insoluble pore-forming ingredients are metal oxides such as titanium dioxide or alkaline earth metal carbonates or formates. Specific illustrations of the latter class of materials are calcium carbonate, calcium formate, and magnesium formate. Polymers such as polymethylmethacrylate can also be used.

It will be appreciated by those skilled in the art that the preferred organic liquid diluent dispersion medium used in the preparation of the electrode of the invention will also contribute a certain amount of porosity to both the interconnected island and matrix components of the hydrophilic layer of the electrode. The addition of the liquid dispersion medium (i.e., organic liquid) to the dry mixture of matrix and interconnected island components contributes additional porosity, primarily in the interconnected island component. The liquid dispersion medium fills the pores of the carbon in the carbon-Teflon interconnected island component and preserves the structure of this component during the processing operation. During processing, the interconnected island material is from 40–60% by weight liquid dispersion medium. Upon removal of the liquid dispersion medium, the interconnected island component remaining has a porosity of about 50–70%. By varying the fractions of matrix and interconnected island components, the total porosity is controlled, along with the distribution of porosity between the matrix and the interconnected island components. A total porosity of about 50 to about 80% with a matrix porosity fraction of about 20 to about 40% is preferred.

The thickness of the active layer of the electrode of the invention will normally be within the range of about 0.05 to about 0.5 millimeters, preferably about 0.2 to about 0.4 millimeters, and most preferably about 0.3 to about 0.4 millimeters. However, the thickness of the active layer can be varied outside these ranges.

Although under certain conditions it will be possible to manufacture the hydrophilic layer of the electrode of the invention by the method described above excluding the use of the preferred organic liquid diluent dispersion medium in the calendering operations, the use of such a diluent dispersion medium is very desirable and facilitates the manufacture of a satisfactory active layer. The organic liquid functions both as a lubricant and as a pore-forming ingredient. Without the diluent dispersion medium, greater difficulties will usually be encountered in the calendering operation as well as other processing operations.

The proportion of dispersion medium such as an organic liquid diluent dispersion medium, will normally be about 20 to about 50 weight percent of the total mixture of the hydrophobic polymer, hydrophilic particulate material, i.e. carbon black or pore-forming ingredient, and diluent dispersion medium. Preferably the proportion of dispersion medium will be about 25 to 35 weight percent. The weight fractions of dispersion medium referred to above refer to the weight percent of said dispersion medium present in the material which is calendered into the final electrode sheet material. Slightly more dispersion medium is needed to prepare the cohesive mass from the dry powders. This excess is removed during pressing to form a block which is subsequently calendered. Following the production of the sheet material by calendering, the sheet is heated to drive off any remaining volatile components therein. It is noted that in production of the electro-chemically active layer of the electrode of the invention, the interconnected island material component thereof is hydrophilic while the matrix material is hydrophobic. This heterogeneous, porous electrode layer is obtained by the preparation of two dispersions, one containing carbon and the other containing a pore-former and each containing a hydrophobic polymer. Subsequent to the preparation of the dispersions, the dispersion medium is filtered out and the filter cake is dried at a temperature sufficient to remove the dispersion medium but below the sintering temperature of the hydrophobic polymer utilized. Thereafter a diluent dispersion medium is added to the dried powders and a cohesive block of material is prepared which is subjected to a calendering operation to fibrillate the hydrophobic polymer component of the mixtures and to form a sheet of material. Subsequently the sheet of material is heated to drive off volatile components and subjected to a sintering operation.

Initially, heating will usually take place at a temperature range of about 100° to 250° C. and will be conducted for a suitable time to effect volatilization, such as about one minute to five hours, preferably about five minutes to about one hour. Thereafter the active layer so formed is sintered at a temperature of about 340° C. to 360° C. for the time required to effect sintering of the hydrophobic polymer binder. Usually about 10 minutes to about one hour is required for sintering. Preferred sintering times are about 15 minutes to about 30 minutes.

In the production of the laminated electrode structure of the invention, a porous, hydrophobic backing material is optionally laminated to the partially hydrophilic, partially hydrophobic active layer of the electrode before removal of the dispersion medium and pore-former subsequent to the calendering operation. A satisfactory porous, hydrophobic backing material can be formed from the matrix component of the active layer of the electrode. Instead of mixing the matrix component with the interconnected island component of the active layer of the electrode of the invention, the matrix component after filtering and the formation of a filter cake can be preseed to form a cohesive block of material which is thereafter calendered to form a sheet.

The formation of the active layer of the electrode of the invention preferably is accomplished by a calendering operation, but other processes can be employed such as pressing the cohesive block to form a sheet. The presence of a particulate pore-former and a dispersion medium is required in the preparation of both the hydrophobic layer and the active layer of the electrode of the invention since the utilization of the dispersion medium as well as the pore-former provides high porosity in the final electrode laminate. If a metal mesh current collector is to be incorporated in the electrode structure, current collector lamination preferably should occur before removal of the pore-forming material.

After cooling the laminated sheet material to ambient temperature, the pore-forming ingredients are removed by suitable processes. Water is a suitable leaching solvent for such water soluble pore-forming ingredients as sodium chloride and potassium chloride. Dilute hydrochloric acid such as 3 to 6 normal hydrochloric acid is a preferred leaching solvent for calcium carbonate when used as a pore-forming ingredient. Acidic leaching solutions are undesirable when a metal current collector is incorporated into the laminated electrode. The leaching operation can take about one to about twenty hours and is the minimum time required to remove the pore-former. Thereafter the hydrophilic layer sheet is washed, usually with water, dried and is thereafter ready for use.

The following example illustrates the various aspects of the invention but is not intended to limit its scope. Where not otherwise specified throughout this specification and claims, temperatures are given in degrees centigrade, and parts, percentages, and proportions are by weight.

EXAMPLE

This example describes the preparation and testing of the electrode in accordance with the invention using a preferred composition. A carbon black supported platinum (5% Pt) and polytetrafluoroethylene dispersion was prepared utilizing a liquid organic diluent characterized as a straight-run petroleum naphtha sold under the tradename VARSOL 3® (VARSOL) (Exxon). In preparing the dispersion containing 95% by weight of carbon supported platinum and 5% by weight polytetrafluoroethylene, 95 grams of carbon sold under the trademark VULCAN XC-72 ® by the Cabot Corporation, with platinum previously deposited on the carbon, and 5 grams of polytetrafluoroethylene were blended with 200 milliliters of VARSOL previously warmed to 75° C. The polytetrafluoroethylene (or TEFLON) was first added to the VARSOL and blended for 15 minutes utilizing a high speed blender to form a TEFLON dispersion. Next, the carbon black supported platinum was added, together with 500 milliliters of VARSOL at ambient temperature, followed by high speed blending for 5 minutes to form a homogeneous mixture. Thereafter, the dispersion was filtered and the solids were transferred to a container suitable for oven drying of the contents. The solids under air flow were maintained at 50° C. for 16 hours (overnight) and at 150° C. for one additional hour and then ground to a fine powder utilizing a low speed blender. A fluffy powder which is easily dry mixed, containing 5 weight percent of polytetrafluoroethylene and 95% weight percent carbon supported platinum was obtained. This material is suitable for use as the electrochemically active component in the fabrication of the hydrophilic layer of the electrode of the invention.

Using 160 grams of sodium chloride having an average particle size of 3 microns, 40 grams of polytetrafluoroethylene, and a total of 500 milliliters of VARSOL previously heated to 75° C., the above procedure was followed for the preparation of a dry powder suitable for use as a matrix component of the hydrophilic layer of the electrode of the invention.

Utilizing the two types of powder prepared above, an electrode layer was prepared by dry mixing 60 grams of the matrix component with 40 grams of the electrochemically active (island) component. To this powder blend there was added sufficient VARSOL at ambient temperature to form a cohesive, pliable dough (about 80 grams of VARSOL). This dough was formed into a block and pressed hydraulically to remove excess VARSOL, leaving 42 grams of VARSOL. This block was calendered in successive passes through the calender rolls to form a thin layer having a thickness of 0.021 inches. The calendering procedure is given below.

| Entering Thickness (in.) | Passes | Exit Thickness (in.) |
|---|---|---|
| 0.425 | 1, 2F* | 0.225 |
| 0.225 | 1, 2F | 0.117 |
| 0.117 | 1 | 0.064 |
| 0.064 | 1 | 0.038 |
| 0.038 | 1 | 0.021 |

*F indicates that the material was folded to double the exit thickness before the next pass through the calender. For all passes through the calender, the material was turned 90° from the previous pass orientation before passing through the rolls.

This electrochemically active layer was subsequently laminated by calendering to a backing layer (0.020 inches in thickness) and a current collector device was pressed into the surface opposite the backing layer again by calendering. The final electrode thickness is 0.030 inches with an active layer thickness of 0.015 inches (0.038 cm). The current collector is a 70% open expanded nickel mesh (EXMET 10 Ni 12-2/0) coated with silver by electroplating. The backing layer is a porous, hydrophobic layer prepared in accordance with the procedure above for the matrix component. The backing layer (80% NaCl, 20% polytetrafluoroethylene) is fabricated by calendering using VARSOL as a diluent. The porosity in this layer and in the active layer is created and maintained during processing by the salt and VARSOL contained in each component layer. Subsequent to lamination, the electrode was heated to 200° C. to remove VARSOL and then sintered at 350° C. for 15 minutes. Next, the electrode assembly was soaked in water overnight at ambient temperature to remove the salt from both the matrix component of the active layer and the backing layer, to generate an electrode with a microporous Teflon layer laminated to a conductive, electrochemically active electrode layer attached to a current collector device.

| Composition Table for the Active Layer (% by weight) | | | |
|---|---|---|---|
| | Before Sintering | Post Sintering | Post Leaching |
| Teflon | 10.4 | 14 | 26.9 |
| Carbon/Pt | 27.0 | 38 | 73.1 |
| Salt | 34.0 | 48 | 0 |
| VARSOL | 28.6 | 0 | 0 |
| Porosity (% by volume) | 0 | 52 | 75.6 |

ELECTRODE TEST DATA

The electrode prepared by the above procedure was operated at 75° C. in 250 grams per liter sodium hydroxide to test performance characteristics. A portion of the data collected is shown below. Operating time is shown in days at the specified current density with oxygen feed at 2 psig. No bulk flow of oxygen through the electrode into the bulk electrolyte was observed. Potential was measured versus a standard calomel electrode (SCE) with the use of a Luggin tip positioned near the surface of the electrode. The resistive component was measured with a current pulse technique and allows removal of the solution and current collector contact resistive components of polarization. These resistance corrected potentials are a measure of performance of the electrode active layer. Differential capacity is a measure of the electroactive surface area wetted by the electrolyte. Thus, it is a measure of the degree and stability of electrolyte penetration into the active material.

| | | Test Data | | |
|---|---|---|---|---|
| Operating time (Days) | Current Density (ma/cm$^2$) | Potential (V vs. SCE) | Resistance Corrected Value (V vs. SCE) | Differential Capacity (u farads/ cm$^2$) |
| 3 | 79 | −0.29 | −0.22 | 0.35 |
| 3 | 316 | −0.51 | −0.26 | |
| 3(air) | 316 | −0.67 | −0.42 | |
| 8 | 316 | −0.52 | −0.26 | 0.32 |
| 66 | 316 | −0.57 | −0.32 | 0.36 |
| 150 | 316 | −0.59 | −0.30 | 0.30 |

The resistance corrected potential data indicate stable operation of the electrode of the invention for extended time with very little if any deterioration of performance over 150 days of operation. The data on air operation indicate excellent gas transport capability presumably through the porosity generated by the matrix component. The capacity data show that the electroactive component is wet rapidly by the electrolyte as the value 0.35 after three days indicates wetting of nearly all of the electroactive material. The capacity data at longer operational time indicate a stable wetted state for the electrode.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A method for the preparation of an electrolyte-permeable polymer sheet useful in the formation of a composite electrode for an electrochemical cell, comprising the steps of:
   (A) preparing an interconnected, hydrophilic island material first dispersion in a liquid dispersion medium, said island material comprising a blend of about 1 to about 10 percent by weight of a hydrophobic polymer and an electrically conductive, hydrophilic, particulate material containing admixed therewith an electrochemically active catalyst;
   (B) preparing a hydrophobic matrix material second dispersion in a liquid dispersion medium comprising a blend of a hydrophobic polymer and a pore-forming ingredient;
   (C) precipitating said hydrophobic polymer onto said pore-forming ingredient and onto said particulate material and drying to remove substantially all of said liquid dispersion medium and produce dry blends of (A) and (B);
   (D) mixing dried blends (A) and (B) with a liquid dispersion medium to produce a cohesive and pliable dough;
   (E) subjecting the dough to a fibrillation step in which the mixture is shear-blended and formed into said electrolyte-permeable polymer sheet;
   (F) sintering, and
   (G) removing said pore-forming ingredient.

2. The method of claim 1 wherein said hydrophobic matrix material second dispersion contains about 20 to about 60% by weight of said hydrophobic polymer and about 40 to about 80% by weight of a pore-forming ingredient.

3. The process of claim 2 wherein precipitation of said hydrophobic polymer onto said pore-forming ingredient and onto said particulate material is accomplished by filtering out said liquid dispersion medium or by raising the temperature of said first and second dispersion from below 15° C. to 30° C. or by destabilizing said first and second dispersions by raising or lowering the pH so as to cause precipitation.

4. The process of claim 3 wherein said electrically conductive, hydrophilic, particulate material comprises carbon black, said electrochemically active catalyst is a precious metal catalyst, said hydrophobic polymer comprises a thermoplastic halocarbon polymer, said pore-forming ingredient is selected from the group consisting of a particulate solid or a polymeric pore-forming ingredient, and said liquid dispersion medium comprises an organic liquid selected from the group consisting of aliphatic and aromatic alcohols, glycols, and amino alcohols.

5. The process of claim 4 wherein said thermoplastic halocarbon polymer is selected from the group consisting of at least one of polymers of tetrafluoroethylene, fluorinated ethylene porpylene, copolymers thereof having the moieties
   $(-CX_1X_2-CX_3CX_4-)$ and
   $(-CY_1Y_2-CY_3Y_4-)$, and
   homopolymers having the moieties
   $(-CY_1Y_2-CY_3F-)$
   wherein $X_1$, $X_2$, $X_3$, $X_4$, $Y_1$, $Y_2$, $Y_3$, and $Y_4$ are selected from the group consisting of fluorine, chlorine, and hydrogen, at least one of said X and Y being fluorine.

6. The process of claim 5 wherein said thermoplastic halocarbon polymer is a fluorocarbon polymer selected from the group consisting of at least one of copolymers having an ethylene moiety and a fluorocarbon moiety chosen from the group consisting of
   $(P-CFH-CH_2-)$,
   $(-CF_2-CH_2-)$,
   $(-CF_2-CFH-)$,
   $(-CF_2-CF_2-)$, and
   $(-CF_2-CClF-)$.

7. The process of claim 6 wherein said fluorocarbon polymer is polytetrafluoroethylene.

8. The process of claim 4 wherein said pore-forming ingredient is a water-soluble salt.

9. The process of claim 8 wherein said water-soluble salt is an alkali metal salt selected from the group consisting of sodium chloride, potassium chloride, and mixtures thereof.

10. The process of claim 9 wherein said pore-forming ingredient is a substantially water-insoluble solid.

11. The process of claim 9 wherein said substantially water-insoluble solid pore-forming ingredient is an alkaline earth metal carbonate.

12. The process of claim 4 wherein said liquid dispersion medium comprises a straight-run petroleum naptha.

13. The process of claim 4 wherein said precious metal catalyst is selected from the group consisting of platinum, silver, palladium, and rhodium.

14. The process of claim 13 wherein said catalyst is selected from the group consisting of platinum and silver.

* * * * *

UNITED STATES PATENT AND TRADEMARK OFFICE
CERTIFICATE OF CORRECTION

PATENT NO. : 4,659,528

DATED : April 21, 1987

INVENTOR(S) : Keith R. Plowman and Charles E. Goldsmith

It is certified that error appears in the above-identified patent and that said Letters Patent is hereby corrected as shown below:

Col. 2, line 5; change "satisafactory" to --satisfactory--.

Col. 4, line 23; delete the period "." after "moieties".

Col. 10, line 13; change "preseed" to --pressed--.

Col. 14, line 9, Claim 5; change "porpylene," to --propylene,--.

Col. 14, line 24, Claim 6; delete "P" from the formula "(P-CFH-$CH_2$-)", the corrected formula should be --(-CFH-$CH_2$-)--.

Signed and Sealed this

Fifth Day of January, 1988

Attest:

DONALD J. QUIGG

*Attesting Officer*  *Commissioner of Patents and Trademarks*